(12) United States Patent
Schlenke et al.

(10) Patent No.: US 10,012,121 B2
(45) Date of Patent: Jul. 3, 2018

(54) REDUCTION OF AERATION INTERFERENCE VIA TORTUOUS PATH AND SENSOR BOOT

(71) Applicant: SSI Technologies, Inc.

(72) Inventors: David T. Schlenke, Janesville, WI (US); Jed William Zenko, Sharon, WI (US)

(73) Assignee: SSI Technologies, Inc., Janesville, WI (US)

( * ) Notice: Subject to any disclaimer, the term of this patent is extended or adjusted under 35 U.S.C. 154(b) by 393 days.

(21) Appl. No.: 14/282,957

(22) Filed: May 20, 2014

(65) Prior Publication Data

US 2015/0337708 A1    Nov. 26, 2015

(51) Int. Cl.
| | | |
|---|---|---|
| *F01N 3/20* | (2006.01) | |
| *G01F 23/00* | (2006.01) | |
| *G01M 15/10* | (2006.01) | |

(52) U.S. Cl.
CPC ........... *F01N 3/2066* (2013.01); *G01F 23/00* (2013.01); *G01M 15/102* (2013.01); *F01N 2900/1811* (2013.01); *F01N 2900/1814* (2013.01); *F01N 2900/1818* (2013.01)

(58) Field of Classification Search
CPC ..... F01N 2900/1811; F01N 2900/1814; F01N 2900/1818; F01N 3/08; F01N 3/20; F01N 3/2066; F01N 3/208; F01N 1900/1811; G01M 15/102; B01D 19/0042; B01D 19/02; B41J 2/19; F01M 11/12; G01F 1/7082; G01F 23/00; G01F 23/296; G01N 21/01

USPC ... 73/61.59, 114.01, 114.38, 114.39, 114.52, 73/114.54, 114.55, 114.71; 347/92
See application file for complete search history.

(56) References Cited

U.S. PATENT DOCUMENTS

| | | | |
|---|---|---|---|
| 4,079,623 A | | 3/1978 | Erwin, Jr. |
| 4,551,719 A | * | 11/1985 | Carlin ...................... B67D 7/32 |
| | | | 340/3.32 |
| 6,171,367 B1 | | 1/2001 | Peng et al. |
| 7,118,206 B1 | | 10/2006 | Stockwell et al. |

(Continued)

FOREIGN PATENT DOCUMENTS

| | | |
|---|---|---|
| CN | 1769883 A | 5/2006 |
| EP | 1998149 A1 | 12/2008 |

(Continued)

OTHER PUBLICATIONS

Non-Patent Literature Soltex, accessed at http://web.archive.org/web/20101229214642/http://www.soltexinc.com/appenginegearsandmotoroils.cfm, archived on Dec. 29, 2010.*

(Continued)

*Primary Examiner* — Peter Macchiarolo
*Assistant Examiner* — Irving A Campbell
(74) *Attorney, Agent, or Firm* — Michael Best & Friedrich LLP (57) ABSTRACT

A fluid sensor for sensing at least one characteristic of a fluid. The fluid sensor including a sensing area; a sensing element configured to sense a characteristic of a fluid located within the sensing area; and a shroud having a textured area. The shroud configured to allow a liquid portion of the fluid to enter and exit the sensing area, and substantially prohibit a gas portion of the fluid to enter the sensing area.

39 Claims, 13 Drawing Sheets

(56) References Cited

U.S. PATENT DOCUMENTS

| | | | |
|---|---|---|---|
| 7,270,690 B1* | 9/2007 | Sindel | B01D 45/08 55/320 |
| 8,899,109 B2* | 12/2014 | Niemann | G01F 23/2962 73/290 V |
| 2003/0181794 A1 | 9/2003 | Rini et al. | |
| 2006/0086175 A1 | 4/2006 | Uchikawa et al. | |
| 2008/0295575 A1 | 12/2008 | Tokuyasu et al. | |
| 2011/0166802 A1 | 7/2011 | Kong et al. | |
| 2011/0226212 A1* | 9/2011 | Niemann | F01M 11/12 123/196 R |
| 2011/0228641 A1 | 9/2011 | Niemann | |
| 2012/0130298 A1 | 5/2012 | Demers et al. | |
| 2013/0220467 A1 | 8/2013 | Ristovski et al. | |

FOREIGN PATENT DOCUMENTS

| | | |
|---|---|---|
| JP | S63250559 A | 10/1988 |
| JP | 2005299441 | 10/2005 |

OTHER PUBLICATIONS

PCT International Search Report and Written Opinion for Application No. PCT/US2015/031622 dated Oct. 7, 2015 (12 pages).
Chinese Patent Office Action for Application No. 201580021512.9 dated Mar. 28, 2018 (23 pages, English translation included).

\* cited by examiner

REDUCTION OF AERATION INTERFERENCE VIA TORTUOUS PATH AND SENSOR BOOT

BACKGROUND

The present invention relates to systems for sensing a fluid. More particularly, embodiments of the invention relate to mechanisms and techniques for reducing interference in measurements caused by air bubbles (e.g., a gas trapped in a liquid) in fluid level and concentration sensors.

Fluid level and fluid concentration sensing is important in a number of vehicle applications including, for example, the sensing of Diesel Exhaust Fluid (DEF) used in a selective catalytic reluctant diesel emission-control system. Selective catalytic reduction (SCR) is a method of converting diesel oxides of nitrogen (NOx) emissions, by catalytic reaction, into diatomic benign nitrogen gas ($N_2$) and water ($H_2O$). DEF is used in the process. In clean diesel engines, an SCR system delivers near-zero emissions of NOx.

DEF is a mixture of purified water and urea. In a typical SCR system, DEF is stored in a tank of a vehicle and is injected via one or more injectors into the exhaust at a ratio of about 1:50 to the diesel fuel being burned. The injected urea (in the form of a mist) mixes with the exhaust and breaks down NOx in the exhaust into nitrogen, water, and carbon dioxide.

When contaminants such as diesel fuel, water, and ethylene gycol, mix with the DEF, the ability of the DEF to reduce the NOx in the exhaust is diminished. Contaminated DEF may also cause damage to the NOx reluctant system. It is also important that a sufficient amount of DEF be available for use in the SCR system. In or near the tank, one or more sensors are used to sense certain characteristics of the DEF. The sensors may include, but are not limited to: a level sensor for determining a quantity of DEF in the tank; a concentration sensor for determine the quality of DEF in the tank; and a temperature sensor. Fluid level is representative of the amount or quantity of fluid and concentration is one characteristic that is representative of the quality of the fluid.

SUMMARY

It has been recently observed that DEF fluid in an SCR system can become aerated (i.e., mixed with air in such a way that bubbles of air are entrained in the fluid). Aeration can occur, for example, during rapid filling or refilling of a tank or reservoir for DEF fluid. Aeration can also occur during severe vibration, fluid sloshing violently within the tank, or may be present in the return flow of the DEF fluid if a pump of the SCR system ingests air. Similar aeration can occur in other fluids as well, including but not limited to, gasoline fuel, diesel fuel, engine oil, hydraulic fluid, and transmission fluid.

Generally, accurate fluid measurements require a homogeneous fluid from which to measure the speed of sound. When the fluid is aerated the path of the ultrasonic sound waves are dispersed by the presence of air bubbles. This interference of the sound waves causes a loss in the reflected echo (i.e., no speed of sound measurement) and thus a loss of accurate fluid measurements.

Accordingly, in one embodiment, the invention provides a fluid sensor for sensing at least one characteristic of a fluid. The fluid sensor including a sensing area; a sensing element configured to sense a characteristic of a fluid located within the sensing area; and a shroud having a textured area. The shroud allows a liquid portion of the fluid to enter and exit the sensing area, and substantially prohibits a gas portion of the fluid to enter the sensing area.

In another embodiment the invention provides a method of preventing gas bubbles in a sensing system for sensing a fluid contained in a tank. The sensing system including a sensing area and a sensor. The method including coupling a shroud to the sensing system, wherein the shroud has a textured area; separating a liquid portion of the fluid and a gas portion of the fluid via the textured area; allowing the liquid portion of the fluid to enter and exit the sensing area; prohibiting the gas portion of the fluid entering the sensing area; and sensing a characteristic of the fluid contained within the sensing area.

In another embodiment, the invention provides a sensor operable to sense a characteristic of a fluid. The sensor including a sensing area configured to contain a fluid; a textured area covering the sensing area; and a transducer. The textured area allows a liquid portion of the fluid to enter the sensing area, and substantially prohibits a gas portion of the fluid to enter the sensing area. The transducer outputs a pulse of sound through the liquid portion of the fluid contained within the sensing area, receives the reflected pulse of sound, and outputs a characteristic of the fluid based on the received pulse of sound.

In another embodiment, the invention provides a shroud configured to overlay a sensor for sensing at least one characteristic of a fluid. The shroud includes a main body including a top portion and a bottom portion; a leg coupled to the bottom portion an exterior portion; and an interior portion including a textured area. The textured area directs a liquid portion of the fluid toward a sensing area of the sensor, and directs a gas portion of the fluid away from the sensing area of the sensor.

It should be observed that the invention is applicable to a variety of fluids, including but not limited to, gasoline fuel, diesel fuel, engine oil, hydraulic fluid, and transmission fluid, all of which are known to foam during sloshing and heavy vibration conditions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Although the invention described herein can be applied to, or used in conjunction with a variety of fluids, fuels and oils (e.g., gasoline fuel, diesel fuel, engine oil, hydraulic fluid, transmission fluid, etc.) and systems (e.g., fuel level, liquid level, concentration measurement, etc.), embodiments of the invention described herein are described with respect to DEF for use in an SCR system.

Figure 1:
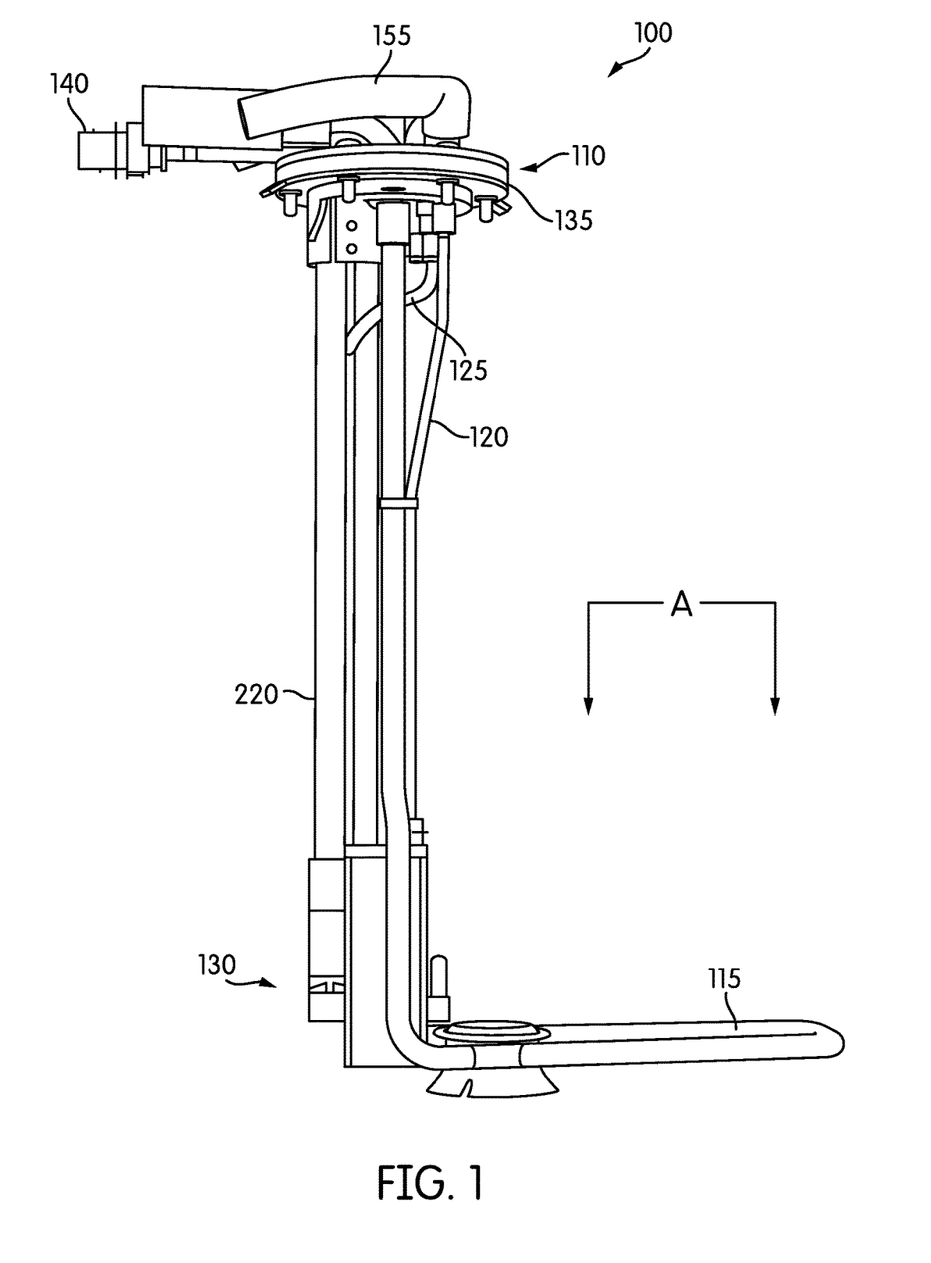
FIG. 1 is a side view of an apparatus for sensing a fluid.
Figure 2:
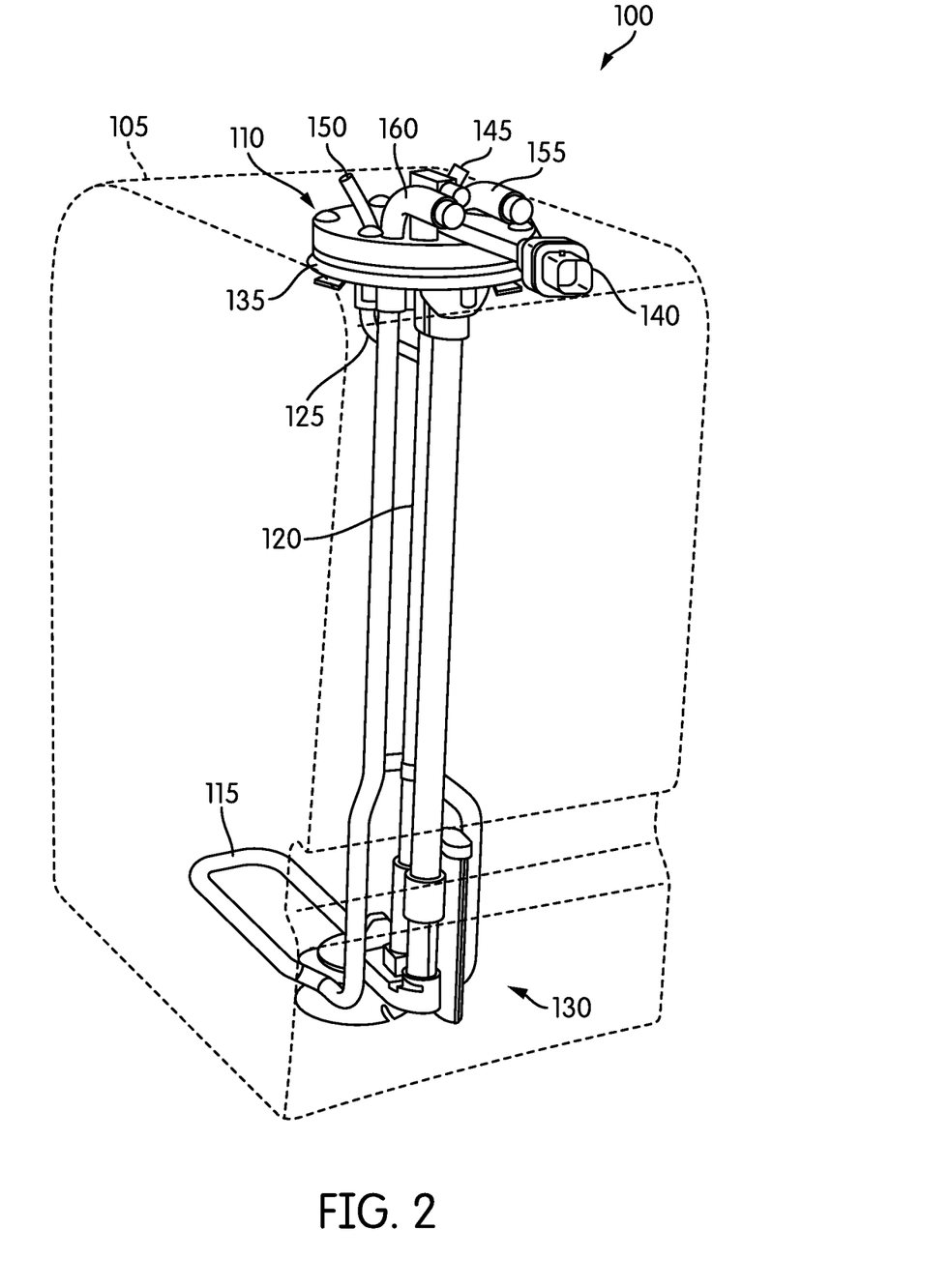
FIG. 2 is a perspective view of the apparatus of FIG. 1.

FIGS. 1 and 2 illustrate an apparatus 100, such as a fluid sensor, for sensing a fluid within a tank 105. In the particular embodiment shown, the apparatus 100 also includes a heater. The heater has certain benefits, but is not required in all embodiments. As noted, in some embodiments, the fluid is DEF (e.g., a urea solution, liquid urea, urea, or Adblue™ fluid). The fluid may have a liquid portion and a gas portion. In some embodiments, the gas portion includes bubbles of air, or another gas, present in the fluid as a result, for example, from sloshing in a tank that mixes air in the fluid.

The apparatus 100 includes a header 110, a heater loop 115, a pickup line 120, a return line 125, and a sensor module or system 130. The header 110 encloses the fluid inside the tank 105. In some embodiments, a gasket 135 seals the header 110 to the tank 105. The header 110 includes a plurality of fittings and an electrical connector 140. In some embodiments, the plurality of fittings include a pickup fitting 145, a return fitting 150, a coolant input fitting 155, and a coolant output fitting 160. The plurality of fittings provides various paths for fluid to be transported or directed into, out of, and through the tank 105. The electrical connector 140 provides an electrical connection from the sensor system 130 to an external computer system (e.g., a vehicle's data bus).

Figure 3:
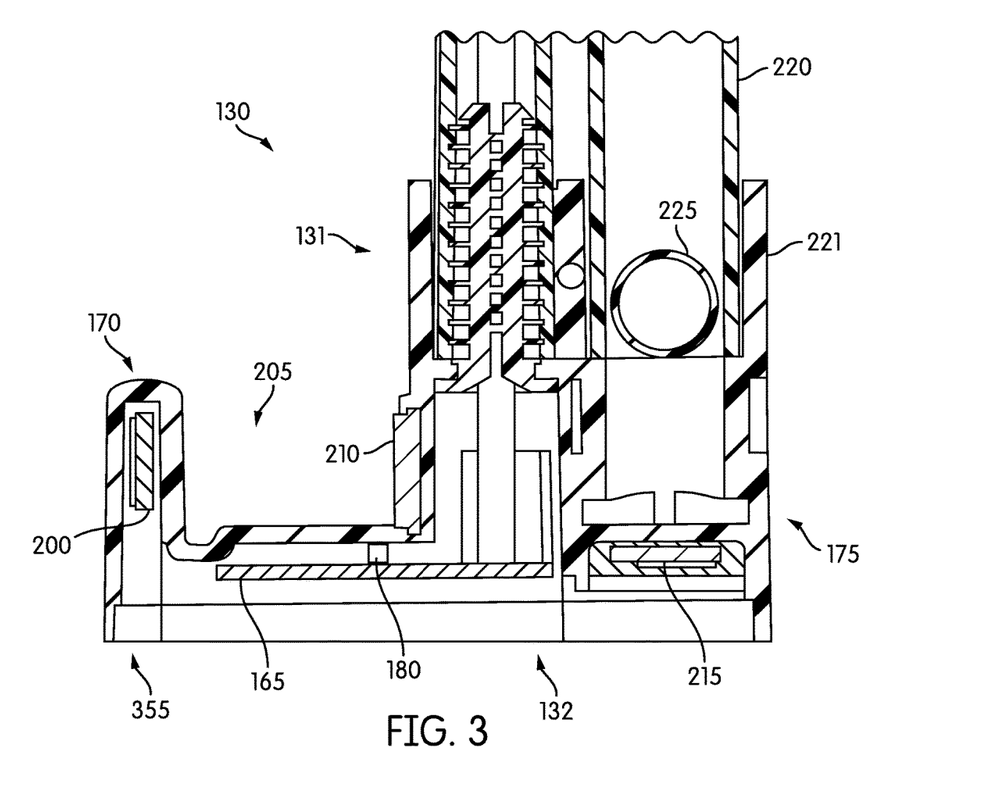
FIG. 3 is a sectional view of a sensing system used in the apparatus of FIGS. 1 and 2.
Figure 4:
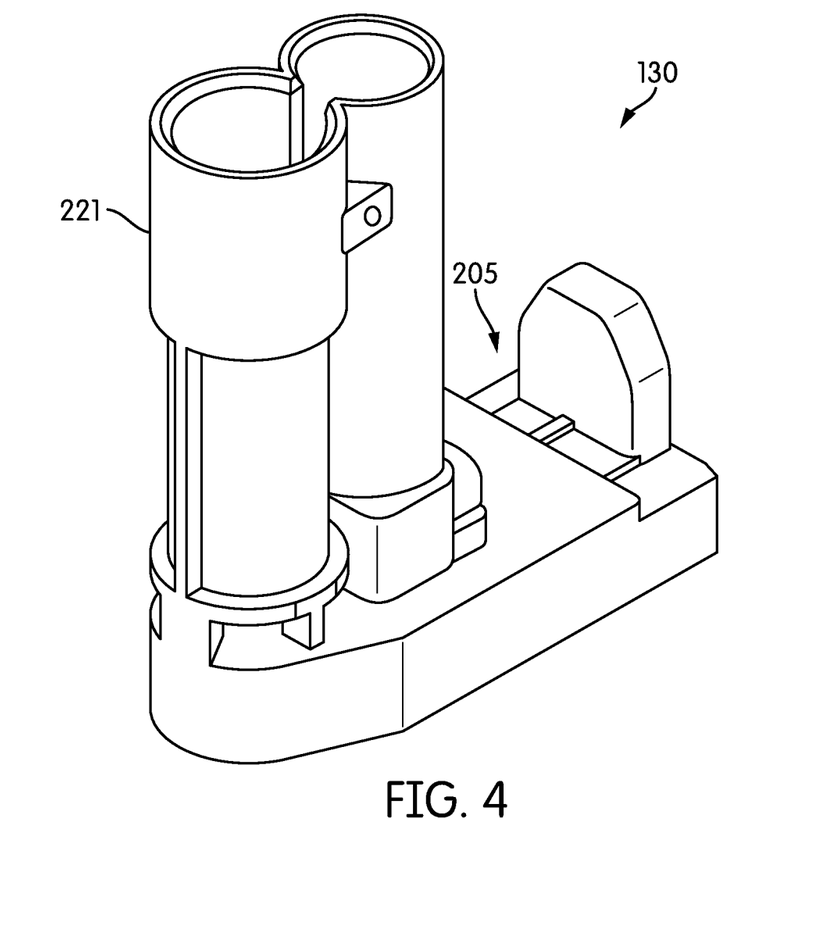
FIG. 4 is a perspective view of the sensing system of FIG. 3.
Figure 5:
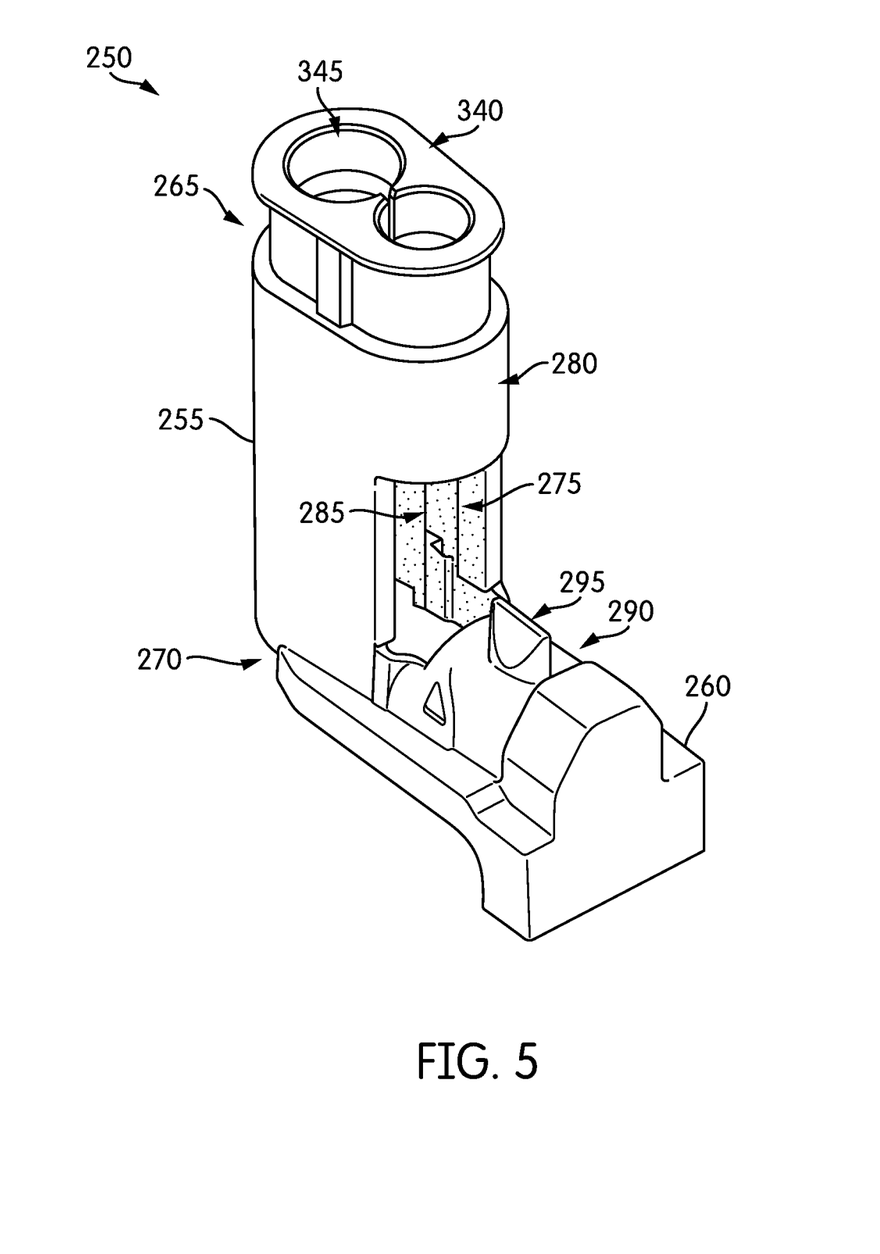
FIG. 5 is a top perspective view of a boot or shroud.
Figure 6:
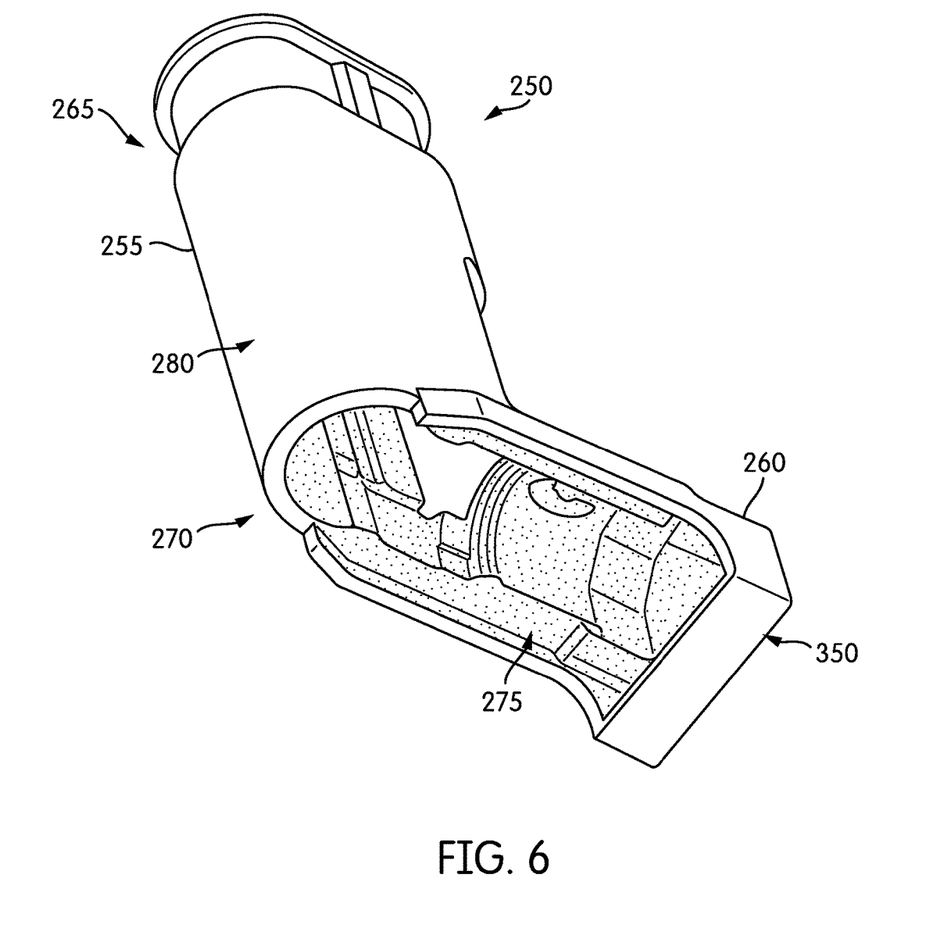
FIG. 6 is a bottom perspective view of the shroud of FIG. 5.
Figure 7:
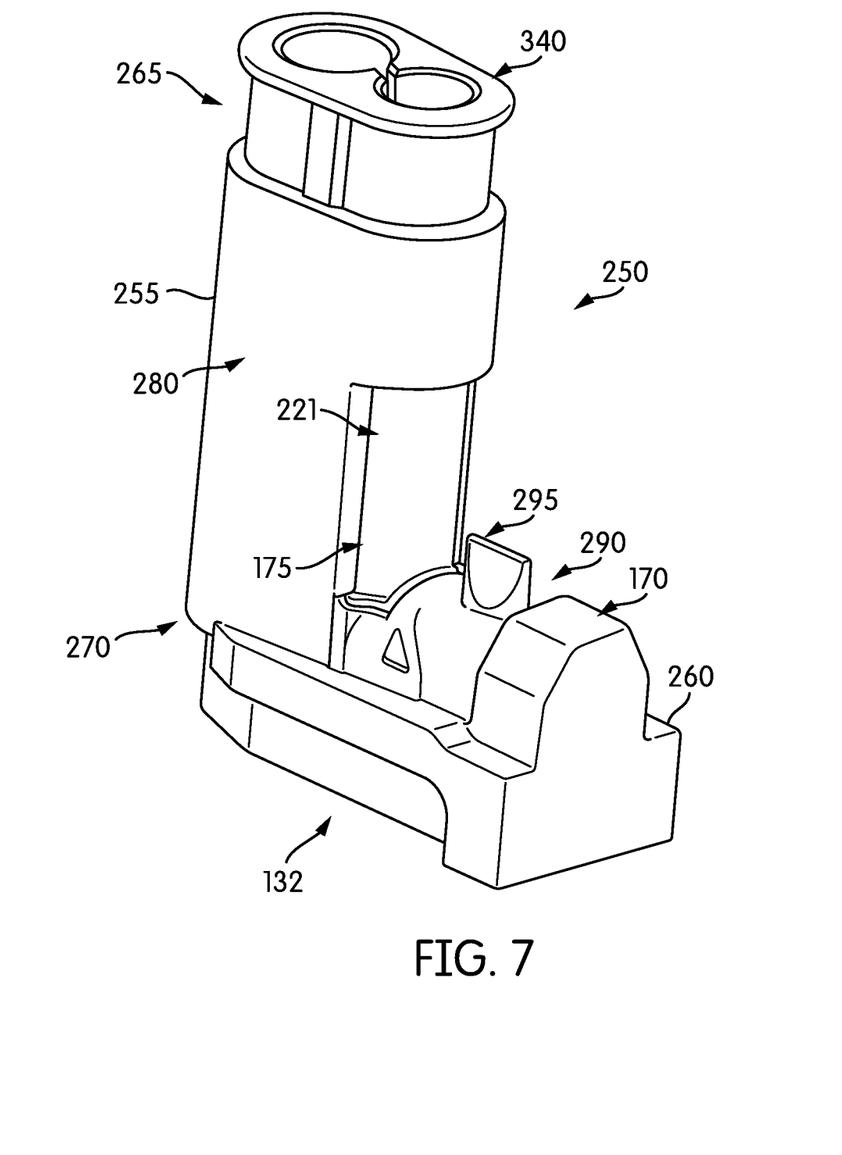
FIG. 7 is a perspective view of the shroud of FIG. 5 coupled to the sensing system of FIG. 3.
Figure 8:
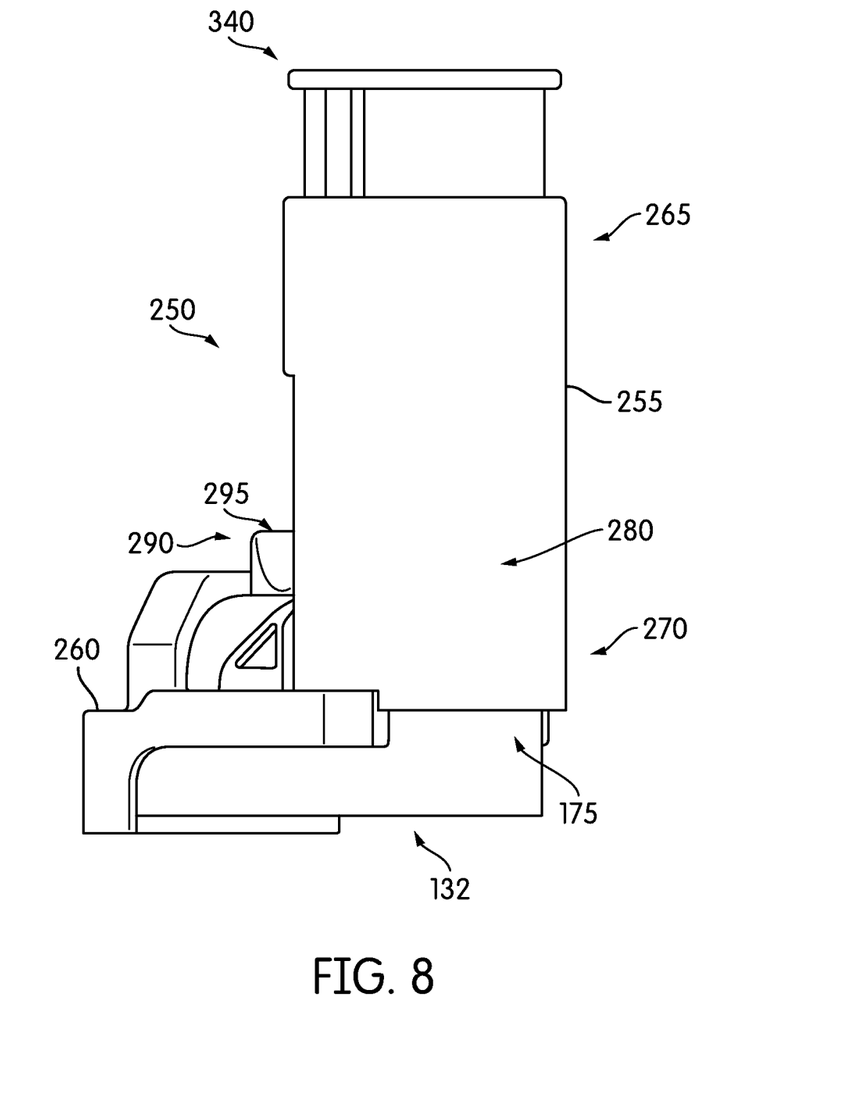
FIG. 8 is a side view of the shroud of FIG. 5 coupled to the sensing system of FIG. 3.

FIGS. 3 and 4 illustrate the sensor system 130. FIG. 3 illustrates a sectional view of the sensor system 130. The sensor system 130 include a top portion 131 and a bottom portion 132. The sensor system 130 includes a printed circuit board (PCB) 165 and a plurality of sensors (i.e., sensing elements). In the illustrated embodiment, the plurality of sensors includes a concentration sensor 170, a level sensor 175, and a temperature sensor 180. In other embodiments, the sensor system 130 may include more or less sensors than shown in the illustrated embodiment. Each of the plurality of sensors is electrically coupled to the PCB 165. In some embodiments, the PCB 165 includes a sensor control system, which, among other things, provides power to the plurality of sensors; analyzes data from the plurality of sensors; and outputs the analyzed data to other components such as an external computer.

The concentration sensor 170 is a concentration sensing element for determining a concentration, and thus a quality, of the fluid within the tank 105. The concentration sensor 170 includes a concentration ultrasonic transducer 200, a measurement channel 205, and a concentration reflector 210. The concentration transducer 200 is a sensing element configured to act as both a transmitter and receiver. In some embodiments, the concentration transducer 200 is a piezoelectric transducer. The measurement channel 205 acts as a sensing area for containing a fluid to be sensed. In operation, the concentration transducer 200 generates an acoustic wave signal, which propagates through the fluid, contained within the measurement channel 205, toward the concentration reflector 210. The acoustic wave signal reflects off of the concentration reflector 210 and travels back toward the concentration transducer 200. The concentration time-of-flight (ToF) of the acoustic wave signal is output to the sensor control system of the sensor system 130. Although shown in the illustrated embodiment, other embodiments of the apparatus 100 do not include a concentration sensor 170.

The level sensor 175 is a level sensing element for determining a level, and thus a quantity, of the fluid within the tank 105. In the illustrated embodiment, the level sensor 175 includes a level transducer 215 such as but not limited to a piezoelectric transducer, a level sensing tube 220 (e.g., a level focus tube), and a level sensing receiving tube 221 configured to receive the level sensing tube 220 and couple the level sensing tube 220 to the sensor system 130. The level transducer 215 is configured to act as both a transmitter and receiver. The level sensing tube 220 acts as a sensing area for containing a fluid to be sensed. In some embodiments, the level sensing tube 220 is a figure-eight level sensing tube having two tubes coupled together in such a fashion such that the level sensing tube 220 resembles the number eight when viewed from direction A (FIG. 1). Some embodiments of the level sensor 175 may also include a float. In the particular embodiment illustrated, the level sensor 175 includes a float 225 located within the level sensing tube 220. Although illustrated as a sphere in FIG. 3, the float 225 may be another shape, including but not limited to, a cylinder. The float 225 floats on the surface of the DEF solution contained within the tank 105. The transducer generates an acoustic wave signal, which propagates through the fluid contained within the level sensing tube 220. The acoustic wave signal propagates toward the float 225. The acoustic wave signal reflects off of the float 225, contained within the level sensing tube 220, and travels back toward the level transducer 215. In one embodiment not including the float 225, the transducer generates an acoustic wave signal, which propagates through the fluid, contained within the level sensing tube 220, toward a surface 227 of the fluid. The acoustic wave signal reflects off of the surface of the fluid and travels back toward the level transducer 215. The ToF of the acoustic wave signal is output to the sensor control system.

The temperature sensor 180 is a temperature sensing element for determining a temperature of the fluid within the tank 105. In one embodiment the temperature sensor 180 is a thermocouple. In another embodiment, the temperature sensor 180 is a thermistor. In yet another embodiment, the temperature sensor 180 is a resistance temperature sensor. In yet another embodiment, the temperature sensor 180 is an infrared temperature sensor. The temperature sensor 180 outputs the sensed temperature to the sensor control system. In some embodiments, the level sensor 175 and the temperature sensor 180 are combined into a combination sensor capable of sensing both a level and a temperature. In some embodiments, the concentration sensor 170 and the temperature sensor 180 are combined into a combination sensor capable of sensing both a concentration and a temperature of the fluid. In other embodiments, the level sensor 175, the temperature sensor 180, and the concentration sensor 170 are combined into a combination sensor capable of sensing all three metrics.

FIGS. 5-8 illustrate a boot or shroud 250 for prohibiting, or inhibiting, the flow of bubbles (i.e., air or other gas trapped in liquid). The shroud 250 overlays the top portion 131 of the sensor system 130. The shroud 250 may be made from rubber or a similar pliable material. In the illustrated embodiment, the shroud 250 is substantially "L" shaped having a main body 255 and a leg 260. The main body 255 has a top portion 265 and a bottom portion 270. The leg 260 is coupled to the main body 255 at the bottom portion 270.

The shroud 250 further has an interior portion 275 and an exterior portion 280. The interior portion 275 of the shroud 250 includes a textured area 285. The textured area 285 causes the fluid to follow one or more tortuous paths. The one or more tortuous paths are configured to direct bubbles within the fluid (a gas portion of the fluid), away from the one or more sensing areas (i.e., the measurement channel 205, the level sensing tube 220, etc.), while a liquid portion of the fluid is directed toward the one or more sensing areas.

The illustrated embodiment of the shroud 250 also includes a chimney 290 having a vent 295. The chimney 290 is configured to exhaust an entrapped gas portion (i.e., entrapped gas bubbles) from the one or more sensing areas. Because the entrapped gas portion is less dense than the liquid and because of convection the gas portion flows out of the one or more sensing areas through the chimney 290. Once the gas portion has exited the sensing areas, the gas portion is free to escape up through the fluid within the tank 105 to a surface of the fluid.

Figure 9:
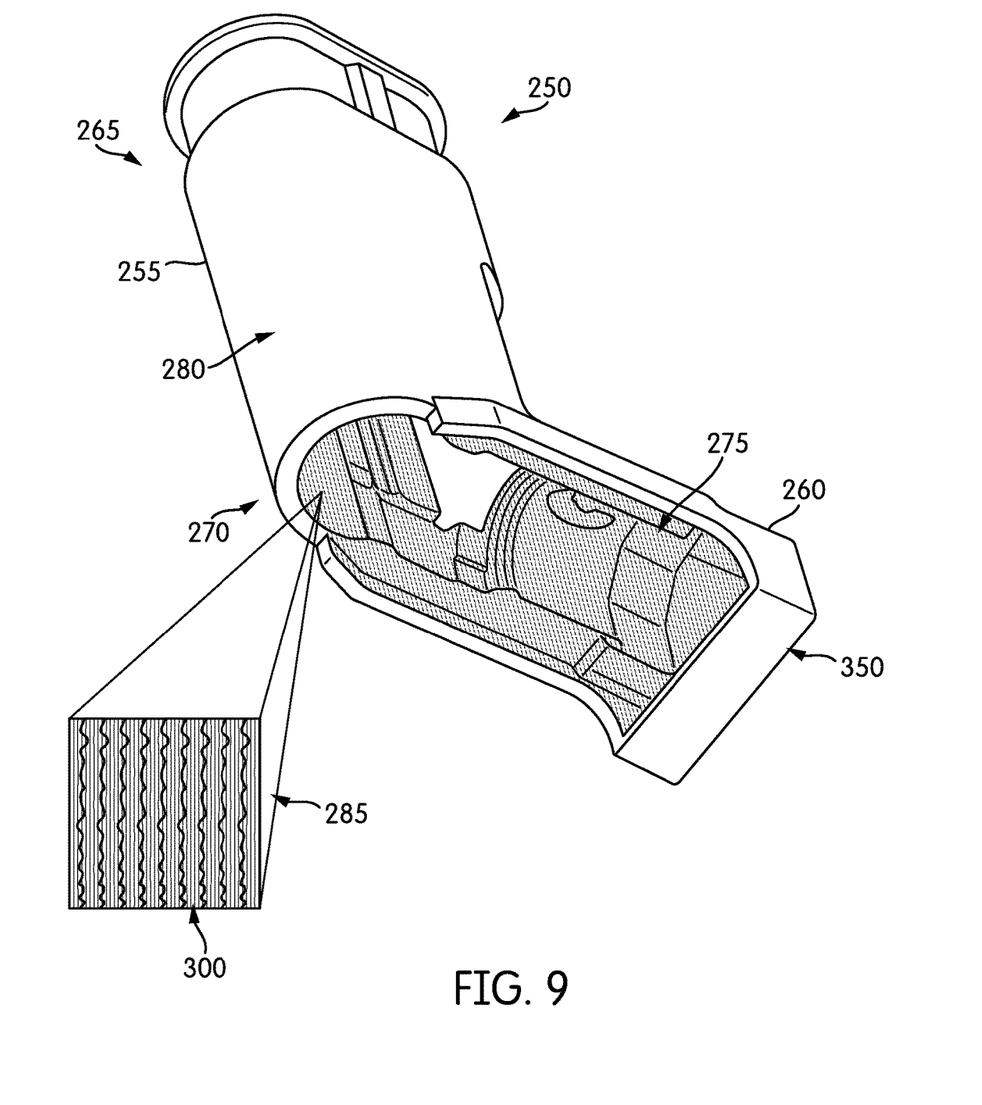
FIG. 9 illustrates one embodiment of a tortuous path of the shroud of FIG. 5.

FIG. 9 illustrates one embodiment of the textured area 285. In some embodiments, the textured area 285 covers the entire interior portion 275 of the shroud 250. In other embodiments, the textured area 285 partially covers the interior portion 275 of the shroud 250. In the illustrated embodiment, the textured area 285 includes a plurality of micro-vents 300 in order to direct the gas portion away from the sensing areas.

Figure 10:
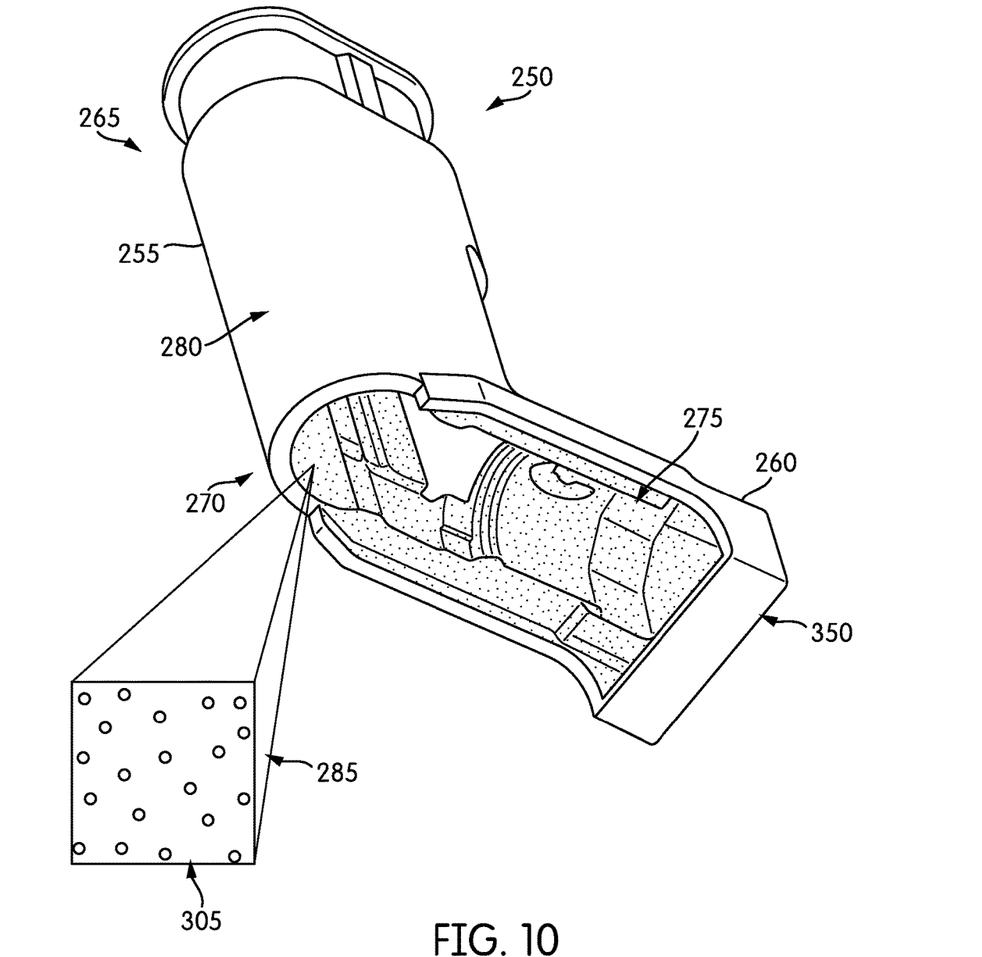
FIG. 10 illustrates another embodiment of a tortuous path of the shroud of FIG. 5.

FIG. 10 illustrates another embodiment of the textured area 285. In the illustrated embodiment, the textured area 285 includes a plurality of micro-cavities 305 in order to direct the gas portion away from the sensing areas.

Figure 11:
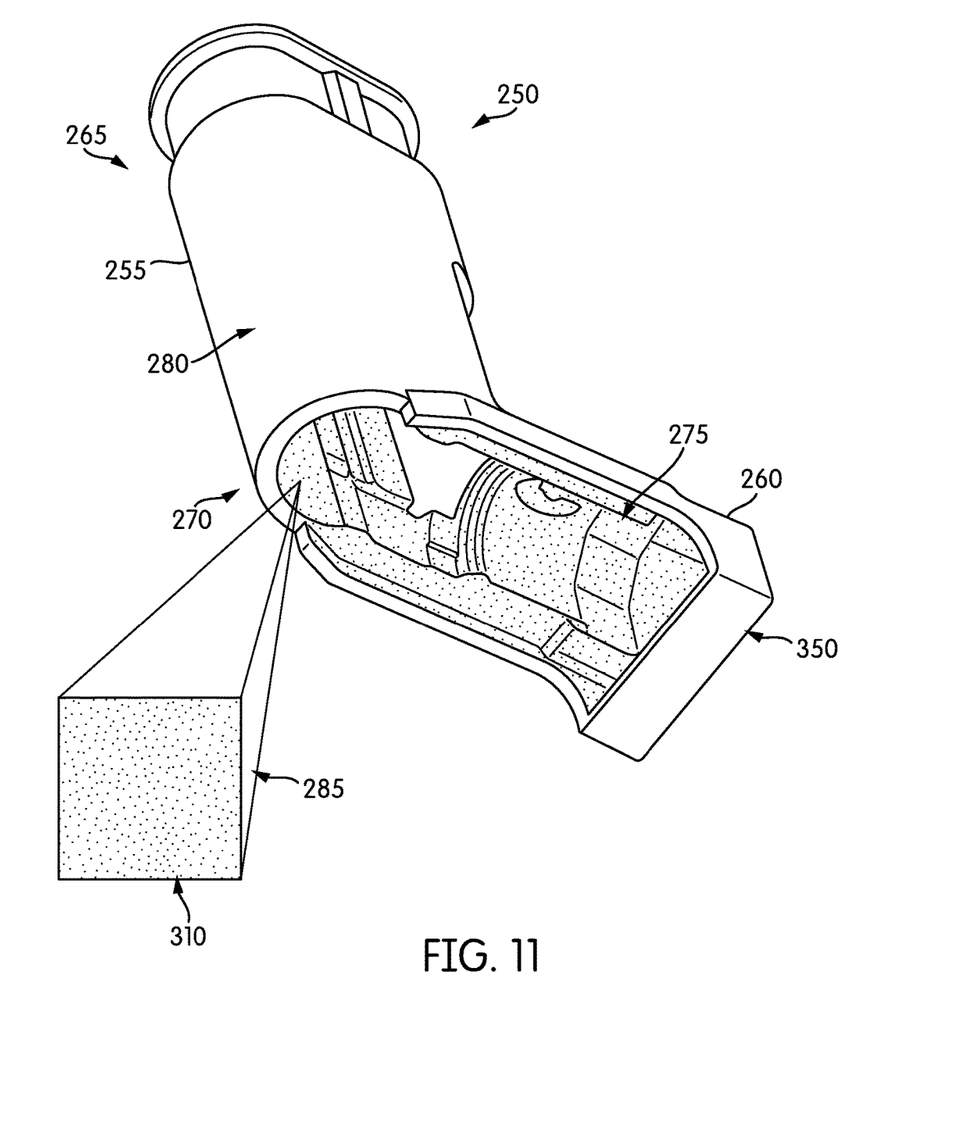
FIG. 11 illustrates another embodiment of a tortuous path of the shroud of FIG. 5.

FIG. 11 illustrates another embodiment of the textured area 285. In the illustrated embodiment, the textured area 285 includes a plurality of raised dots, or stipples, 310 in order to direct the gas portion away from the sensing areas.

In another embodiment, the textured area 285 includes a combination of one or more of a plurality of micro-vents 300, a plurality of micro-cavities 305, and a plurality of raised dots 310. In another embodiment, the textured area 285 is similar to a sand-blasted texture, or the texture of sand paper.

Figure 12:
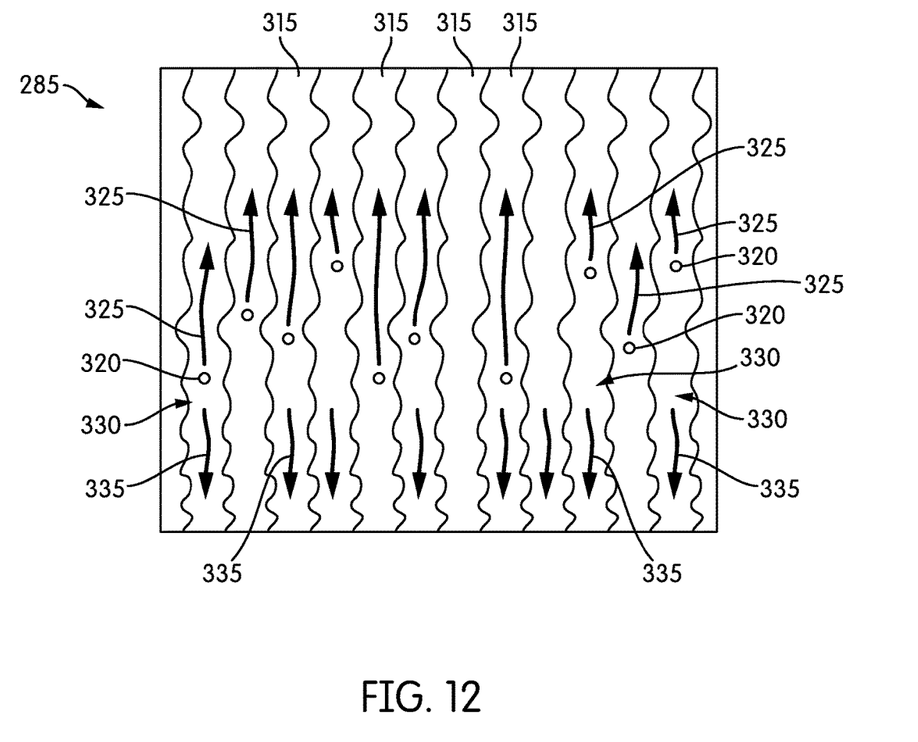
FIG. 12 illustrated an example of operation of the shroud of FIG. 5.

FIG. 12 illustrates one example of operation of the fluid in one embodiment of the textured area 285. As the fluid enters the sensor system 130, the textured area 285 forces the fluid to follow one or more tortuous paths 315, thereby directing the gas portion 320 in a first direction 325, away from the sensing area, while directing the liquid portion 330 in a second direction 335, towards the sensing area. The gas portion 320 and the liquid portion 330 are first separated as a result of the textured area 285. The gas portion 320 is then directed in the first direction 325, away from the sensing area, because the density of the gas portion 320 is less than the density of the liquid portion 330. Thus, the gas portion 320 flows upward (e.g., the first direction 325) away from the sensing area. The liquid portion 330 is then directed in the second direction 335, to the sensing area, as a result of gravity.

In the illustrated embodiment of FIGS. 5-8, the shroud 250 further includes a port or receptacle 340. In the embodiment show, the receptacle 340 is a dual-opening port configured to receive the level sensing tube 220 and couples the level sensing tube 220 to the level sensing receiving tube 221 of the sensor system 130. In some embodiments, the receptacle 340 includes a plurality of striations (e.g., ridges) 345 configured to promote coupling of the bottom portion of the level sensing tube 220 to the level sensing receiving tube 221 of the sensor system 130.

In the illustrated embodiment of FIGS. 5-8, the shroud 250 further includes a retainer. The retainer is configured to hold the shroud 250 onto the sensor system 130. The retainer may include a toe clip 350. The toe clip 350 is configured to capture a toe 355 of the sensor system 130 in order to retain the shroud 250 onto the sensor system 130.

Figure 13:
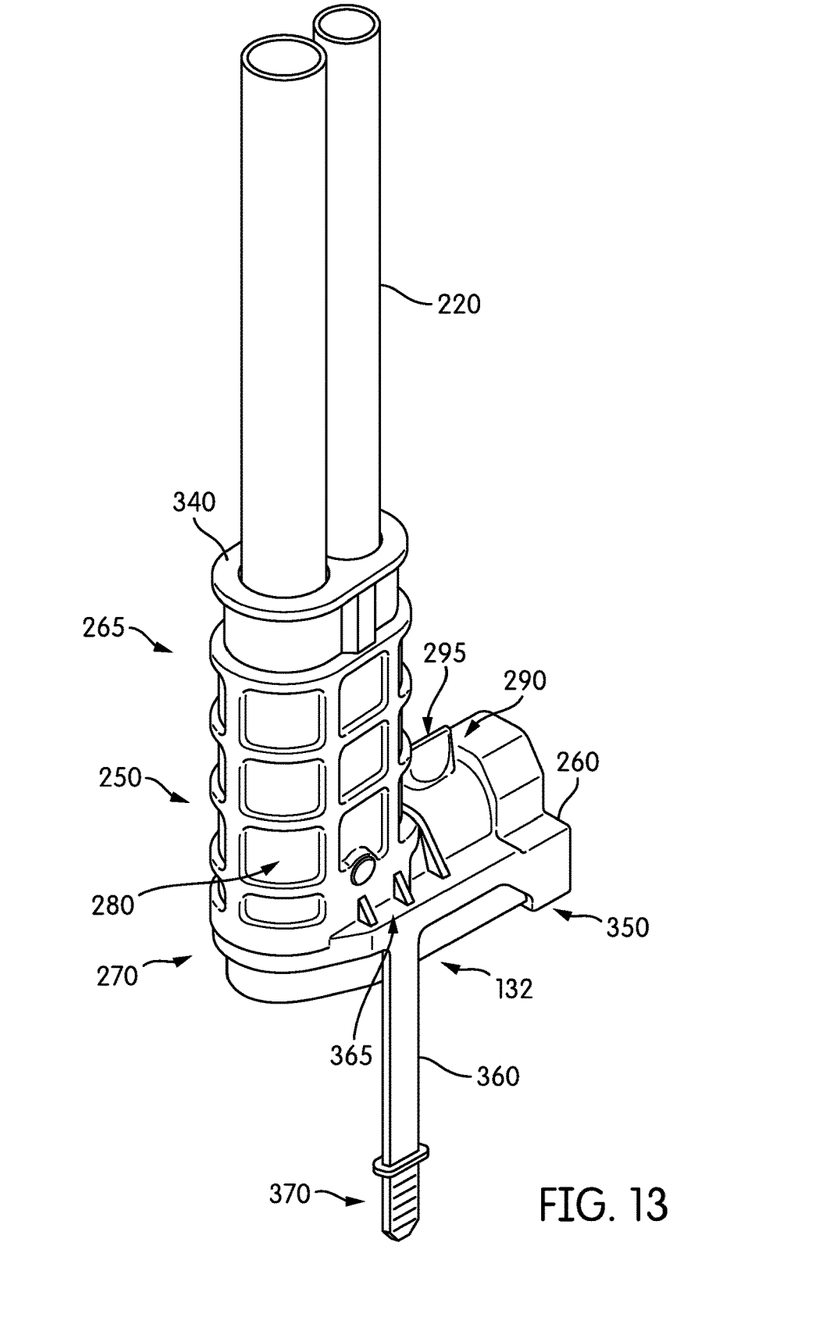
FIG. 13 is a perspective view of the shroud of FIG. 5 coupled to the sensing system of FIG. 3.

As illustrated in FIG. 13, the retainer may further include a strap 360. The strap 360 extends from a first side 365 of the shroud 250, wraps around a bottom portion 132 of the sensor system 130, and releasably attaches to a second side, opposite the first side, of the shroud 250. In the illustrated embodiment, the strap 360 includes a buckle 370 for releasably attaching the strap 360 to the second side of the shroud 250.

Thus, the invention provides, among other things, a shroud for a fluid sensing system. Various features and advantages of the invention are set forth in the following claims.

What is claimed is:

1. A fluid sensor for sensing at least one characteristic of a fluid, the fluid sensor comprising:
   a sensing area;
   a sensing element configured to sense a characteristic of a fluid located within the sensing area; and
   a shroud including an interior portion having a textured area facing the sensing area, the shroud configured to
      direct a liquid portion of the fluid along the textured area of the interior portion to enter the sensing area, and
      direct a gas portion of the fluid along the textured area of the interior portion in an upward direction away from and out of the sensing area.

2. The fluid sensor of claim 1, wherein the textured area causes the fluid to follow a tortuous path.

3. The fluid sensor of claim 1, wherein the textured area includes one of a plurality of micro-vents, a plurality of micro-cavities, and a plurality of stipples.

4. The fluid sensor of claim 1, wherein the shroud includes a retainer.

5. The fluid sensor of claim 4, wherein the retainer includes a strap.

6. The fluid sensor of claim 4, wherein the retainer includes a toe clip.

7. The fluid sensor of claim 6, wherein the toe clip is configured to capture a toe of the fluid sensor.

8. The fluid sensor of claim 1, wherein the shroud further includes a chimney configured to exhaust an entrapped gas portion of the fluid from the sensing area.

9. The fluid sensor of claim 1, wherein the sensing area is one of a measurement channel and a level sensing tube.

10. The fluid sensor of claim 1, wherein the sensing element is one of a concentration sensing element, a level sensing element, and a temperature sensing element.

11. The fluid sensor of claim 1, wherein the fluid is one of a urea solution, a gasoline fuel, a diesel fuel, an engine oil, a hydraulic fluid, and a transmission fluid.

12. A method of preventing gas bubbles in a sensing system for sensing a fluid contained in a tank, the sensing system including a sensing area and a sensor, the method comprising:
coupling a shroud to the sensing system, wherein the shroud includes an interior portion having a textured area facing the sensing area;
directing a liquid portion of the fluid and a gas portion of the fluid via the textured area of the interior portion;
allowing the liquid portion of the fluid to enter the sensing area;
directing the gas portion of the fluid along the textured area in an upward direction away from and out of the sensing area; and
sensing a characteristic of the fluid contained within the sensing area.

13. The method of claim 12, wherein the textured area causes the fluid to follow a tortuous path.

14. The method of claim 12, wherein the textured area includes one of a micro-vent, a micro-cavity, and a stipple.

15. The method of claim 12, wherein the shroud include a retainer for coupling to the sensing system.

16. The method of claim 15, wherein the retainer includes a strap.

17. The method of claim 15, wherein the retainer includes a toe clip configured to capture a toe of the sensing system.

18. The method of claim 12, wherein the shroud further includes a chimney configured to exhaust an entrapped gas portion of the fluid from the sensing area.

19. The method of claim 12, wherein the sensing area is one of a measurement channel and a level sensing tube.

20. The method of claim 12, wherein the sensor is one of a concentration sensor, a level sensor, and a temperature sensor.

21. The method of claim 12, wherein the fluid is one of a urea solution, a gasoline fuel, a diesel fuel, an engine oil, a hydraulic fluid, and a transmission fluid.

22. A sensor operable to sense a characteristic of a fluid, the sensor comprising:
a sensing area configured to contain the fluid;
a shroud covering the sensing area, the shroud including an interior portion having a textured area facing the sensing area, the textured area configured to
direct a liquid portion of the fluid to enter the sensing area, and
direct a gas portion of the fluid in an upward direction away from and out of the sensing area; and
a transducer operable to
output a pulse of sound through the liquid portion of the fluid contained within the sensing area,
receive a reflected pulse of sound, and
output a characteristic of the fluid based on the received reflected pulse of sound.

23. The sensor of claim 22, wherein the textured area causes the fluid to follow a tortuous path, the tortuous path configured to separate the liquid portion of the fluid from the gas portion of the fluid.

24. The sensor of claim 22, wherein the sensing area is one of a measurement channel and a level sensing tube.

25. The sensor of claim 22, wherein the characteristic is one of a concentration, a level, and a temperature.

26. The sensor of claim 22, wherein the fluid is one of a urea solution, a gasoline fuel, a diesel fuel, an engine oil, a hydraulic fluid, and a transmission fluid.

27. The sensor of claim 22, wherein the textured area covers the sensing area via a shroud.

28. The sensor of claim 27, wherein the shroud includes a chimney configured to exhaust an entrapped gas portion from the sensing area.

29. A shroud configured to overlay a sensor for sensing at least one characteristic of a fluid, the shroud comprising:
a main body including a top portion, a bottom portion, an exterior portion, and an interior portion, the interior portion including a textured area facing a sensing area of the sensor, the textured area configured to
direct a liquid portion of the fluid toward the sensing area of the sensor, and
direct a gas portion of the fluid in an upward direction away from and out of the sensing area of the sensor; and
a leg coupled to the bottom portion.

30. The shroud of claim 29, wherein the textured area causes the fluid to follow a tortuous path.

31. The shroud of claim 30, further comprising a retainer.

32. The shroud of claim 31, wherein the retainer includes a toe clip.

33. The shroud of claim 32, wherein the toe clip is configured to capture a toe of the sensor.

34. The shroud of claim 31, wherein the retainer includes a strap.

35. The shroud of claim 34, wherein the shroud further including a first side and a second side, and the sensor includes a bottom portion, further wherein the strap extends from the first side of the shroud, wraps around the bottom portion of the sensor, and releasably attaches to the second side of the shroud.

36. The shroud of claim 29, wherein the textured area includes a plurality of micro-vents.

37. The shroud of claim 29, wherein the textured area includes a plurality of micro-cavities.

38. The shroud of claim 29, wherein the textured area includes a plurality of stipples.

39. The shroud of claim 29, further comprising a chimney configured to exhaust an entrapped gas portion of the fluid from the sensing area.

* * * * *